United States Patent

[11] 3,621,285

| [72] | Inventors | Karl F. Anderson;<br>Thomas L. Lynch, both of Lancaster, Calif. |
|---|---|---|
| [21] | Appl. No. | 872,602 |
| [22] | Filed | Oct. 30, 1969 |
| [45] | Patented | Nov. 16, 1971 |
| [73] | Assignee | The United States of America as represented by the Administrator of the National Aeronautics and Space Administration |

[54] PULSED EXCITATION VOLTAGE CIRCUIT FOR TRANSDUCERS
10 Claims, 2 Drawing Figs.

[52] U.S. Cl. .................................. 307/237,
    328/1, 307/317, 307/254, 328/151, 73/88.5
[51] Int. Cl. .................................. H03k 5/08
[50] Field of Search .......................... 307/255,
    309, 310, 317, 243, 254, 237; 73/88.5, 89; 328/1, 151

[56] References Cited
UNITED STATES PATENTS

| 2,775,118 | 12/1956 | Legee et al. ............... | 73/88.5 |
| 3,015,959 | 1/1962 | Courtney-Pratt ............. | 73/88.5 |
| 3,179,817 | 4/1965 | Bounsall .................. | 307/255 |
| 3,231,753 | 1/1966 | Brown .................... | 307/255 |
| 3,305,176 | 2/1967 | Brace .................... | 307/255 |
| 3,197,780 | 7/1965 | Gilchrist ................. | 73/88.5 |

*Primary Examiner*—Donald D. Forrer
*Assistant Examiner*—Harold A. Dixon
*Attorneys*—G. T. McCoy, J. H. Warden and Paul F. McCaul ABSTRACT: A pulsed excitation voltage circuit for a strain gauge bridge is disclosed using a transformer having its primary winding adapted to receive an excitation timing pulse and two secondary windings to turn on two transistor switches adapted to connect positive and negative voltage sources of equal amplitude to opposite ends of the bridge. Voltage limiting diodes are connected to output terminals to limit common-mode voltage spikes resulting from different turn-on and turnoff times of the transistor switches. Each transistor switch includes a base resistor selected at time of assembly to provide substantially equal turn-on times. A speedup capacitor may be used to further equalize turn-on time, and a shunt capacitor may be used at the output of one switch to offset effects of unequal turn-on times.

PATENTED NOV 16 1971 3,621,285

INVENTORS
KARL F. ANDERSON
THOMAS L. LYNCH
BY
ATTORNEYS

PULSED EXCITATION VOLTAGE CIRCUIT FOR TRANSDUCERS

The invention described herein was made by an employee of the United States Government and may be manufactured and used by or for the Government for Governmental purposes without the payment of any royalties thereon or therefor.

BACKGROUND OF THE INVENTION

This invention relates to electrical measuring systems, and particularly to systems employing resistive transducers in a bridge.

Excitation systems which cause a resistive transducer to dissipate over 0.1 watt generally require frequent recalibration due to heating effects. In a semiconductor strain gauge, for example, variations in the temperature of the bridge elements will introduce undesirable errors. Efforts have been made to provide compensation for such variations, but it is better to minimize the problem.

One way of minimizing the problem is to provide excitation in pulses. However, heating effects are proportional to sampling, average power given by the product of the pulse duty cycle, i.e., the ratio of the pulse duration to the pulse repetition period, and the peak power dissipated. Therefore, it is desirable to keep the pulse duration as short as possible or to reduce the pulse repetition rate to achieve a low-duty cycle. The latter alternative is possible in only those applications which do not require a high sampling rate. The practical choice then is to reduce the excitation pulse period to about 50 to 60 microseconds. That is made possible by synchronizing a high-speed sampling, low-level voltage measuring system with the excitation pulses. The actual measurement is made during the last portion of the excitation pulse.

An advantage of this synchronized excitation and sampling technique is that the excitation voltage may be increased by a factor of ten, for example, without exceeding the power dissipation of the lower excitation voltage applied full time. The higher excitation voltage then provides an output signal of one order of magnitude greater. The voltage stability of semiconductor switches is a much smaller percentage of the 10 to 100 volt excitation level than of millivolt transducer output levels. Accordingly, this technique is far superior to the technique of continually applying a low excitation voltage to minimize power dissipation and having to amplify very low-level output signals, but it does present switching transient problems.

In the past, a pulse-excited bridge was sampled through an amplifier designed to ignore common mode voltages, such as a differential amplifier connected between the output terminals of the bridge. However, that design approach does not minimize the problem of switching transients. Instead, it requires a longer duty cycle to allow the switching transients to subside before a measurement is made, thereby increasing the power dissipation which results in an increase in error due to temperature variations.

An object of this invention is to improve isolation of an electrical measuring transducer from a system for selectively actuating the transducer with an excitation pulse.

Another object is to minimize the presence of switching transients in the form of common mode voltage spikes at the output terminals of a bridge actuated by an excitation pulse.

SUMMARY OF THE INVENTION

In accordance with the invention, a transformer having a primary winding and two secondary windings is provided to isolate an electrical measuring transducer from a system for selectively actuating the transducer with an excitation pulse. That pulse coupled into the secondary windings turns a pair of transistors on. The conducting transistors connect opposite ends of the transducer to terminals of a power supply.

When the transducer is in the form of a Wheatstone bridge, the opposite ends which are connected to terminals of the power supply are on one diagonal. To avoid common mode voltages on output terminals at opposite ends of a second diagonal, the two power supply terminals are at equal voltage levels of opposite polarities, and to minimize switching transients which will affect the time of sampling after a pulse is applied across the primary winding, one of the transistors is trimmed with a speed up capacitor as necessary to assure that both transistors turn on at the same time. A trimming capacitor may also be employed between one end of the aforesaid one diagonal and instrument ground to balance the stray capacitances between the power supply terminals and the ends of that one diagonal. Alternatively, diodes may be employed between the bridge output terminals and instrument ground to limit the common mode voltage of either polarity at each output terminal to the internal voltage drop of forward biased diodes.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
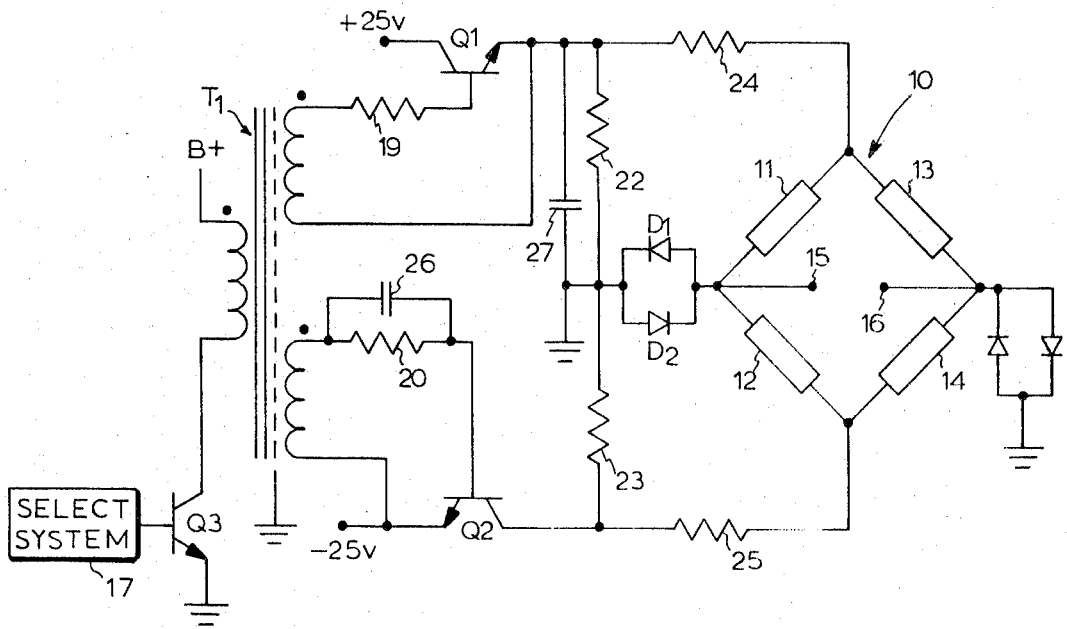
FIG. 1 is an embodiment of the present invention illustrating the use of two alternative novel techniques for minimizing common mode voltages at output terminals of a bridge.

An embodiment of the present invention is illustrated in FIG. 1 as a circuit for providing pulsed excitation voltage to a strain gauge in the form of a Wheatstone bridge 10 having transducers 11 to 14. However, it should be understood that the present invention is not limited to strain gauges.

The series transducers 11 and 12 are excited in parallel with the series transducers 13 and 14 through NPN transistors $Q_1$ and $Q_2$ which, when turned on, apply +25 v. and −25 v. to the ends of one diagonal of the bridge 10. If the resistances of the transducers 11 to 14 are selected or adjusted to be equal, the output voltage between terminals 15 and 16 connected to ends of a second diagonal of the bridge 10 will remain at zero when the transistors $Q_1$ and $Q_2$ are turned on. An output voltage in the order of, for example, 5 to 50 millivolts will be detected across the output terminals 15 and 16 only when the resistance of one of the transducers is varied.

In a typical application, a digital data acquisition system will employ 80 circuits similar to that shown in FIG. 1, with a basic sampling rate for each circuit of 200 per second. Control pulses for exciting a given circuit can be supplied through a conventional rectangular matrix using a row select network in conjunction with a column select network in a system 17 to turn on a transistor $Q_3$ for a predetermined pulse period, such as 62.5 microseconds. A data acquisition system (not shown) is synchronized to sample the output voltage across terminals 15 and 16 of the bridge 10 during the last half of that pulse period. Therefore, the pulsed excitation voltage to the bridge must be constant during the last 31 microseconds.

Two secondary windings are provided in the transformer $T_1$. One is connected across the base-emitter junction of the transistor $Q_1$ and the other across the base-emitter junction of the transistor $Q_2$. The sense of each secondary winding (indicated in the drawing by the dot convention) turns on both transistors $Q_1$ and $Q_2$ when a positive pulse is produced across the primary winding. Resistors 19 and 20 included in the base circuits of the respective transistors $Q_1$ and $Q_2$ are selected to help control the turn-on time of each transistor. If one transistor turns on before the other, such as the transistor $Q_1$ before the transistor $Q_2$, a common-mode voltage spike will occur at the output of the bridge 10, as shown by a spike 21 in FIG. 2. Once the other transistor $Q_2$ is turned on, the spike is removed, but due to stray capacitance of the bridge 10 and the cables connected to it, a finite time is required for the spike voltage to discharge, Resistors 22 and 23 provide a discharge path for that residual voltage. The remaining resistors 24 and 25 are provided to attenuate the excitation voltage to the level desired for the bridge 10.

It may be seen that if the common mode spike 21 is too large, it will not be completely discharged within 31 microseconds after both transistors $Q_1$ and $Q_2$ are turned on, and in the worst case may not be discharged when the complete excitation period of 62.5 microseconds has lapsed. Unless there is some assurance that such spikes will have been discharged before the sampling occurs in the last half of the excitation period, a common-mode voltage error may be introduced.

A speedup capacitor 26 may be connected across the base resistor of the slow transistor to assure that both transistors turn on simultaneously, and a shunt capacitor 27 may be connected to the output of the fast transistor, as shown in FIG. 1, assuming the transistor $Q_1$ turns on faster than the transistor $Q_2$. Such a shunt capacitor will delay application of the positive voltage to the bridge 10 until the transistor $Q_2$ is turned on to provide a negative voltage that will meet and cancel it at the bridge 10. However, these techniques of selecting resistors and capacitors at the time of assembly may not suffice indefinitely because the characteristics of the transistors will change with age and temperature.

Figure 2:
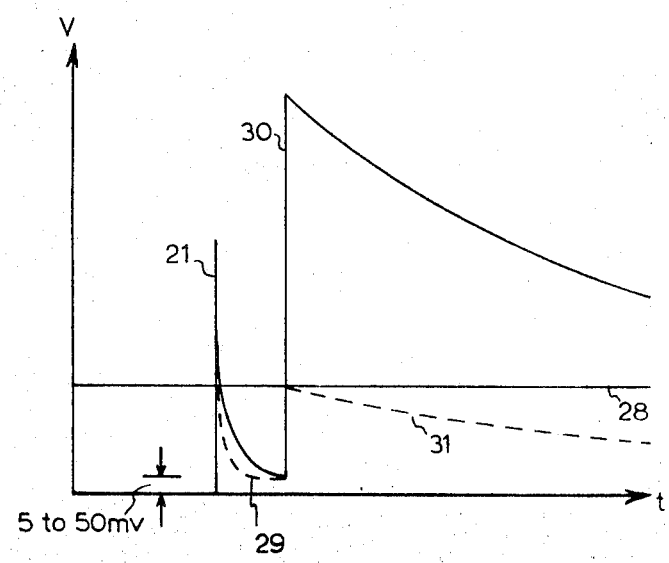
FIG. 2 is a waveform illustrating the possible common mode voltage at output terminals of a pulse excited bridge.

To guard against common-mode spikes under all conditions, semiconductor diodes are connected in pairs between ground and output terminals 15 and 16. The diodes of a given pair, such as diodes $D_1$ and $D_2$ between terminal 15 and ground, are oppositely poled to guard against voltage spikes of both polarities. A typical semiconductor diode will have a maximum voltage drop when forward biased of the order of 0.5 to 0.75 volt, which is significantly less than might otherwise be the maximum voltage spike. For instance, if the horizontal line 28 of FIG. 2 represents the voltage limiting level of the diode $D_1$, the common-mode spike 21 present at terminal 15 will be limited to that level. When the transistor $Q_2$ turns on, the discharge time for the residual voltage stored in stray capacitance will be significantly less, as indicated by the dotted line 29 within the spike 21.

Since the limiting diodes provide a known maximum common-mode voltage at the output terminals 15 and 16, a proper value can be selected for the resistors 22 and 23 that will assure a constant excitation voltage across the bridge 10 within 31 microseconds, or such other period as the application of the present invention may require. Thus any change in turn-on time of the transistors $Q_1$ and $Q_2$ will not introduce a common-mode voltage error in the sampled output.

The limiting diodes will also be effective to limit common-mode voltage spikes at turnoff time of the transistors $Q_1$ and $Q_2$. Such spikes are apt to be quite large, as shown by a spike 30 in FIG. 2, since no effort is made to control turnoff time. Normally, such a spike can be ignored since ample time for it to be discharged would lapse between excitation periods as controlled by the select system 17. However, if the amplitude of the spike at turnoff time is also limited, the frequency at which a particular transducer can be excited through the select system 17 is increased.

The RC time constant for the discharge path of a common mode spike at turnoff time is very large as compared to the RC time constant of the discharge path of a common mode spike at turn-on time because once the transistors $Q_1$ and $Q_2$ are turned off, the only discharge paths are through the resistors 22 and 23, whereas while the transistors $Q_1$ and $Q_2$ are turned on additional discharge paths are provided through them and their associated power supplies. Thus the conducting transistors $Q_1$ and $Q_2$ provide low-impedance discharge paths in parallel with resistors 22 and 23, respectively, to speed up discharge of any common mode spike during a pulsed excitation period of the bridge 10.

Assuming that limiting diodes are not provided, if the discharge time for the common mode spike 30 is greater than the period between excitation pulses, a common-mode voltage will be present at the time the transistors $Q_1$ and $Q_2$ are turned on which may add to any common-mode voltage spike produced at turn on time. Providing the limiting diodes significantly decreases the discharge time of the turnoff common mode voltage as indicated by the dotted line 31.

It should be noted that although single units are shown for transistors $Q_1$ and $Q_2$, a pair of similar transistors may be employed as shown by R.L. Bright in an article titled "Junction Transistors Used as Switches" published in AIEE Transactions, Communication and Electronics, Vol. 74, Part 1, Mar. 1955, pages 119 and 120, particularly if the excitation voltages are to be alternating currents since the Bright switch is capable of blocking or conducting voltages of either polarity. Another possibility is the use of a pair of similar transistors the collectors of which are connected together, with the base of one connected directly to the emitter of the other. The pair constitutes an equivalent single transistor having emitter and collector resistances substantially equal to those of one of the transistors, but having a current multiplication factor greater than either of the transistors alone.

It should also be noted that the positive and negative voltages connected to resistors 24 and 25 by the respective transistors $Q_1$ and $Q_2$ should be regulated in accordance with standard practice. There may be some change in the voltage drop across the transistors due to environmental temperature changes. However, the change will be negligible as compared to the large positive and negative 25 volts supplied. Smaller voltages such as 10 volts could be supplied instead and the change due to temperature would still be negligible. If such a small voltage is supplied than a change due to temperature becomes significant, standard techniques for temperature compensation may be employed. Accordingly, in as much as it is recognized that modifications and variations falling within the spirit of the invention will occur to those skilled in the art, it is not intended that the scope of the invention be determined by the disclosed exemplary embodiment.

What is claimed is:

1. A pulsed excitation voltage circuit for a transducer having first and second ends and an output terminal therebetween comprising:
    a first source of voltage of a predetermined amplitude and polarity with respect to a source of reference potential;
    a second source of voltage of said predetermined amplitude and a polarity opposite the polarity of said first source;
    first switching means for coupling said first voltage source to said first end of said transducer;
    second switching means for coupling said second voltage source to said second end of said transducer;
    means for selectively turning on said first and second switching means at substantially the same time; and
    means connected to said output terminal for limiting the voltage excursion thereof.

2. Apparatus as defined in claim 1 wherein said means for selectively turning on said first and second switching means comprises a transformer having a primary winding adapted to receive a pulse, and two secondary windings, one for each of said switching means.

3. Apparatus as defined in claim 2 wherein each of said first and second switching means comprises a junction transistor having a base-emitter junction and a collector-to-emitter circuit, and having one of said secondary windings connected across said base-emitter junction, and having said collector-to-emitter circuit connected in series between one of said first and second voltage sources and one of said first and second ends of said transducer, and wherein each of said transistors includes a resistor in series with one of said secondary windings connected across said base-emitter junction, said resistor having a value selected to control transistor turn-on time such that both transistors turn on at substantially the same time in response to said pulse.

4. Apparatus as defined in claim 3 including a speedup capacitor in parallel with said series resistor connected to one of said transistors.

5. Apparatus as defined in claim 1 including a first shunt resistor connected between said source of reference potential and a junction between said first switching means and said first end of said transducer, and a second shunt resistor connected between said source of reference potential and a junction between said second switching means and said second end of said transducer.

6. Apparatus as defined in claim 4 including a capacitor in parallel with one of said shunt resistors.

7. A pulsed excitation voltage circuit for a bridge-type transducer having four branches with a first end at a junction between one pair of branches, a second end at a junction between the remaining pair of branches, and first and second output terminals connected to the remaining junctions, comprising:

a first source of voltage of a predetermined amplitude and polarity with respect to a source of reference potential;

a second source of voltage of said predetermined amplitude and a polarity opposite the polarity of said first source;

first switching means for coupling said first voltage source to said first end of said transducer;

second switching means for coupling said second voltage source to said second end of said transducer;

means for selectively turning on said first and second switching means at substantially the same time; and first and second means connected to said first and second output terminals, respectively, for limiting the voltage excursions of said output terminals equally.

8. Apparatus as defined in claim 7 wherein each of said first and second limiting means comprises a pair of junction diodes connected between one of said output terminals, and said source of reference potential, said diodes of a given pair being oppositely poled such that the cathode of one is connected directly to the anode of the other.

9. Apparatus as defined in claim 8 wherein said means for selectively turning on said first and second switching means comprises a transformer having a primary winding adapted to receive a pulse, and two secondary windings, one for each of said switching means.

10. Apparatus as defined in claim 9 wherein each of said first and second switching means comprises a junction transistor having a base-emitter junction and a collector-to-emitter circuit, and having one of said secondary windings connected across said base-emitter junction, and having said collector-to-emitter circuit connected in series between one of said first and second voltage sources and one of said first and second ends of said transducer, and wherein each of said transistors includes a resistor in series with one of said secondary windings connected across said base-emitter junction, said resistor having a value selected to control transistor turn-on time such that both transistors turn on at substantially the same time in response to said pulse.